United States Patent

Akaki et al.

[11] Patent Number: 5,882,842
[45] Date of Patent: Mar. 16, 1999

[54] ACTIVE ENERGY RAY-CURABLE RESIN COMPOSITION

[75] Inventors: Yu Akaki; Fumio Yamashita, both of Yokohama; Yasuo Takaya, Ninomiya-machi; Osamu Isozaki, Yokohama, all of Japan

[73] Assignee: Kansai Paint Co., Ltd., Hyogo-ken, Japan

[21] Appl. No.: 800,214

[22] Filed: Feb. 12, 1997

[30] Foreign Application Priority Data

Feb. 16, 1996 [JP] Japan .................................... 8-029483

[51] Int. Cl.$^6$ ........................................................ C08F 2/46
[52] U.S. Cl. ........................... 430/280.1; 522/31; 522/32; 522/33; 522/59; 522/63; 522/65; 522/66; 522/67; 522/100; 522/129; 522/168; 522/170
[58] Field of Search .......................... 430/280.1; 522/25, 522/27, 28, 31, 32, 33, 52, 59, 63, 65, 66, 67, 129, 168, 170, 100

[56] References Cited

U.S. PATENT DOCUMENTS 3,835,003  9/1974  Schlesinger ........................ 522/168 X
4,277,554  7/1981  Eranian et al. ....................... 430/280.1
5,721,020  2/1998  Takami et al. .......................... 427/508

OTHER PUBLICATIONS

WPI Abstract Accession No. 96–461566/46 & JP 080231938A (TOA GOSEI) Sep. 10, 1996.
WPI Abstract Accession No. 96–306849/31 & JP 080134405A (TOA GOSI) May 28, 1996.
JP 08–134,405 English Translation, Niwa et al., May 28, 1996.
JP 08–231,938 English Translation, Tanba et al., Sep. 10, 1996.

*Primary Examiner*—Bernard P. Codd
*Attorney, Agent, or Firm*—Wenderoth, Lind & Ponack, L.L.P.

[57] ABSTRACT

An active energy ray-curable resin composition, particularly an active energy ray-curable coating composition, both comprising:

(A) a resin having oxetane functional groups and epoxy groups in the molecule, and
(B) a photo-induced cationic polymerization initiator.

11 Claims, No Drawings

ACTIVE ENERGY RAY-CURABLE RESIN COMPOSITION

BACKGROUND OF THE INVENTION

1. Field of the Invention

The present invention relates to a novel active energy ray-curable resin composition.

2. Description of the Prior Art

Active energy ray-curable resin compositions having photo-induced cationic polymerizability have advantages, for example, in that their polymerization is not affected by oxygen. Therefore, they are finding a number of usages such as coating composition and the like. They, however, have a drawback in that their sensitivity to active energy ray to give rise to photo-induced cationic polymerization is inferior to the sensitivity of unsaturated groups to active energy ray to give rise to photo-induced radical polymerization.

In order to alleviate the drawback, it was attempted to use a resin having an oxetane group(s) as a crosslinking functional group. This attempt, however, is not satisfactory from the standpoint of photo-sensitivity.

SUMMARY OF THE INVENTION

The present inventors made a study in order to alleviate the above-mentioned drawbacks of conventional active energy ray-curable resin compositions. As a result, the present inventors found out that use of a resin having oxetane functional groups and epoxy groups as crosslinking functional groups gives improved photo-sensitivity and resultant higher velocity of photo-induced cationic polymerization. The present invention has been completed based on the finding.

According to the present invention there is provided an active energy ray-curable resin composition comprising:

(A) a resin having, in the molecule, epoxy groups and oxetane functional groups represented by the following formula (I)

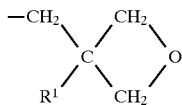

(wherein $R^1$ is a hydrogen atom, an alkyl group of 1–6 carbon atoms, a fluorine atom, a fluoroalkyl group of 1–6 carbon atoms, an allyl group, an aryl group, an aralkyl group, a furyl group or a thienyl group), and (B) a photo-induced cationic polymerization initiator.

DETAILED DESCRIPTION OF THE INVENTION

Resin (A) having oxetane functional groups and epoxy groups in the molecule

The resin composition of the present invention is characterized by comprising, as the main resin component, a resin (A) having, in the molecule, oxetane functional groups represented by the above formula (I) and epoxy groups as crosslinking functional groups.

In the above definition of $R^1$ of formula (I), "alkyl group of 1–6 carbon atoms" may be a straight-chain type or a branched chain type and includes, for example, methyl, ethyl, n-propyl, isopropyl, n-butyl, 30 isobutyl, sec-butyl, tert-butyl and n-hexyl; "fluoroalkyl group of 1–6 carbon atoms" is a group obtained by substituting at least one of the hydrogen atoms of the above alkyl group with a fluorine atom and includes, for example, fluoropropyl, fluorobutyl and trifluoropropyl; "aryl group" may be monocyclic or polycyclic and also may be an aromatic ring having at least one alkyl group substituent of 1–6 carbon atoms and includes, for example, phenyl, toluyl, xylyl and naphthyl; and "aralkyl group" is an arylalkyl group whose aryl moiety and alkyl moiety have the above meanings, respectively, and includes, for example, benzyl and phenethyl.

Preferable as $R^1$ is an alkyl group of 1–6, particularly 1–4 carbon atoms, such as methyl or ethyl.

Preferably, the oxetane functional groups are present in the side chain(s) or main chain of the resin (A) via an oxygen-containing bond such as ether bond, ester bond, urethane bond or the like or via a hydrocarbon chain containing at least one of the above bonds.

The oxetane functional groups can be present in the molecule of the resin (A) in an amount of average about two or more, preferably average about 2–100, more preferably average about 2–50.

Meanwhile, the epoxy groups can be present in the molecule of the resin (A) in an amount of average about two or more, preferably average about 2–100, more preferably average about 2–50.

The resin (A) is preferably soluble in organic solvents generally used in the coating field, or soluble or dispersible in aqueous media. Further, the resin (A) preferably has a number-average molecular weight of generally about 300–200,000, preferably about 500–100,000, more preferably about 1,000–50,000.

There is no particular restriction as to the type of the resin (A) and there can be used various types of resins such as acrylic resin, polyester resin, polyurethane resin, polyether resin and the like. When the resin composition of the present invention is used as a coating, the resin (A) is particularly preferably an acrylic resin in view of, for example, the weatherability and durability of coating film formed.

The acrylic resin having oxetane functional groups of formula (I) and epoxy groups can be produced, for example, by copolymerizing:

(a) an unsaturated monomer having an oxetane group of formula (I) at one end of the molecule and a radical polymerizable unsaturated group at the other end of the molecule, (b) an epoxy group-containing acrylic unsaturated monomer and, as necessary, (c) other copolymerizable radical-polymerizable unsaturated monomer.

The oxetane functional group-containing unsaturated monomer (a) can be produced, for example, by reacting a 3-hydroxymethyloxetane compound represented by the following formula (II)

(wherein $R^1$ has the same definition as given above) with an unsaturated compound having, at one end of the molecule, a complementary functional group supplementarily reactive with the hydroxyl group of the above formula (II) but substantially non-reactive with oxetane group, for example, an isocyanate group, a lower alkoxy group (e.g. methoxy or ethoxy) or a lower alkoxycarbonyl group (e.g. methoxycarbonyl or ethoxycarbonyl) and, at the other end of the molecule, a radical-polymerizable unsaturated group, for example, an acryloyl group, a methacryloyl group or a vinyl group.

The compound of formula (II), for example, 3-ethyl-3-hydroxymethyloxetane can be produced by reacting trimethylolpropane with diethyl carbonate to obtain a hydroxyl group-containing cyclic carbonate and then subjecting the carbonate to decarboxylation.

The unsaturated compound to be reacted with the compound of formula (II) includes, for example, (meth)acrylic acid, methyl (meth)acrylate, isocyanatoethyl (meth)acrylate, m-isopropenyl-α,α-dimethylbenzyl isocyanate, N-methoxymethyl(meth)acrylamide, N-butoxymethyl (meth)acrylamide, methyl vinyl ether and ethyl vinyl ether.

The epoxy group-containing acrylic unsaturated monomer (b) includes, for example, glycidyl (meth)acrylate and 3,4-epoxycyclohexylmethyl (meth)acrylate.

The radical-polymerizable unsaturated monomer (c) copolymerizable with the monomers (a) and (b) includes, for example, $C_{1-24}$ alkyl or cycloalkyl esters of (meth)acrylic acid, such as methyl (meth)acrylate, ethyl (meth)acrylate, butyl (meth)acrylate, 2-ethylhexyl (meth)acrylate, cyclohexyl (meth)acrylate and the like; $C_{2-8}$ hydroxyalkyl esters of (meth)acrylic acid, such as 2-hydroxypropyl (meth)acrylate, caprolactone-modified hydroxyethyl (meth) acrylate and the like; carboxyl group-containing unsaturated monomers such as (meth)-acrylic acid and the like; aromatic vinyl compounds such as styrene, α-methylstyrene, vinyltoluene and the like; fluorine-containing unsaturated monomers such as perfluorobutylethyl (meth)acrylate, perfluoroisononylethyl (meth)acrylate and the like; polymerizable amides such as (meth)acrylamide and the like; and polymerizable nitrites such as (meth)acrylonitrile and the like. These monomers can be used singly or in combination of two or more monomers by appropriate selection depending upon the properties desired for the resin formed.

The copolymerization of the monomers (a), (b) and (c) can be conducted by a per se known process, for example, solution polymerization, suspension polymerization, emulsion polymerization or bulk polymerization.

Photo-induced cationic polymerization initiator (B)

The photo-induced cationic polymerization initiator (B) used in the present invention is a compound which generates a cation upon irradiation with an active energy ray and initiates cationic polymerization of oxetane functional group and epoxy group. It includes, for example, the hexafluoroantimonates (salts), pentafluorohydroxyantimonates (salts), hexafluorophosphates (salts), hexafluoroarsenates (salts) and other photo-induced cationic polymerization initiators represented by the following formulas (III) to (XIV):

$$Ar_2I^+.X^- \quad (III)$$

(wherein Ar is an aryl group, for example, a phenyl group; and $X^-$ is $PF_6^-$, $SbF_6^-$ or $AsF_6^-$).

$$Ar_3S^+.X^- \quad (IV)$$

(wherein Ar and $X^-$ each have the same definition as given above),

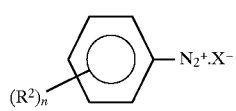
(V)

(wherein $R^2$ is an alkyl group of 1–12 carbon atoms or an alkoxy group of 1–12 carbon atoms; n is an integer of 0–3; and $X^-$ has the same definition as given above),

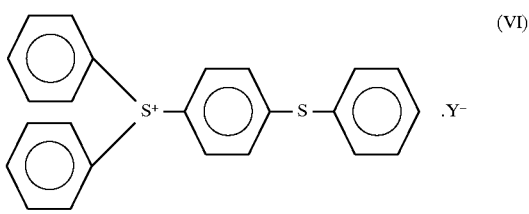
(VI)

(wherein $Y^-$ is $PF_6^-$, $SbF_6^-$, $AsF_6^-$ or $SbF_5(OH)^-$),

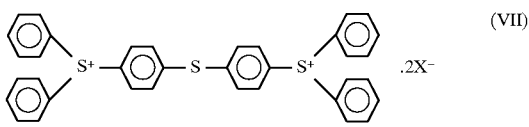
(VII)

(wherein $X^-$ has the same definition as given above),

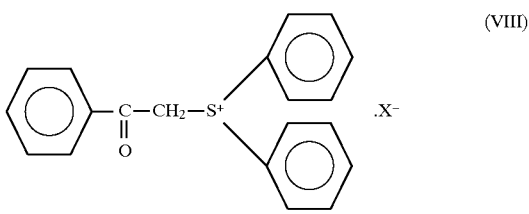
(VIII)

(wherein $X^-$ has the same definition as given above),

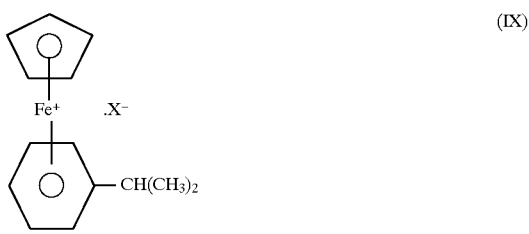
(IX)

(wherein $X^-$ has the same definition as given above),

(X)

(wherein $R^3$ is an aralkyl group of 7–15 carbon atoms or an alkenyl group of 3–9 carbon atoms; $R^4$ is a hydrocarbon group of 1–7 carbon atoms or a hydroxyphenyl group; $R^5$ is an alkyl group of 1–5 carbon atoms which may contain an oxygen atom(s) or a sulfur atom(s); and $X^-$ has the same definition as given above),

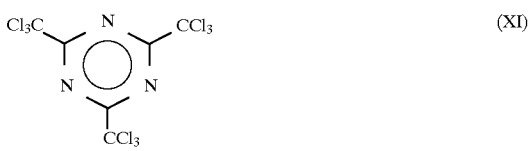
(XI)

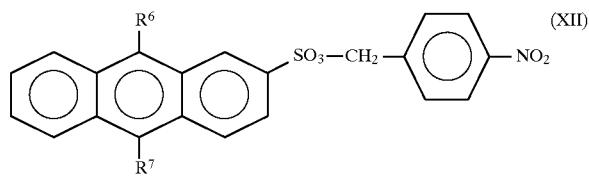
(XII)

(wherein $R^6$ and $R^7$ are each independently an alkyl group of 1–12 carbon atoms or an alkoxy group of 1–12 carbon atoms),

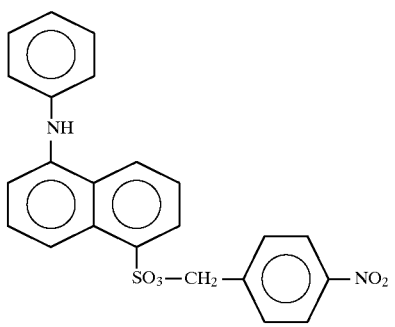
(XIII)

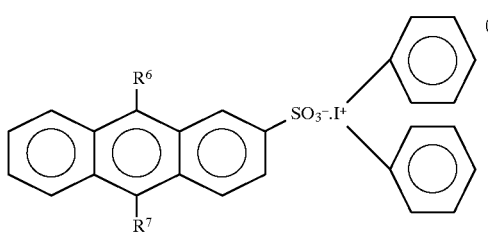
(XIV)

(wherein $R^6$ and $R^7$ each have the same definition as given above),

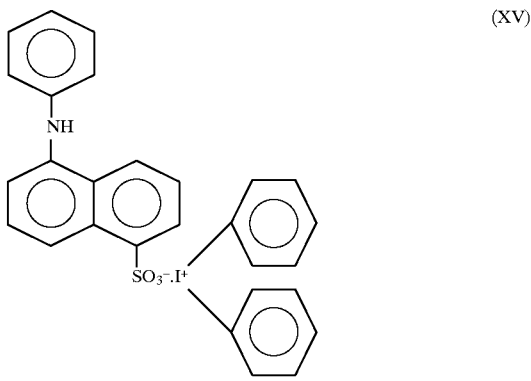
(XV)

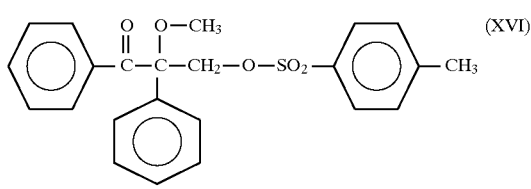
(XVI)

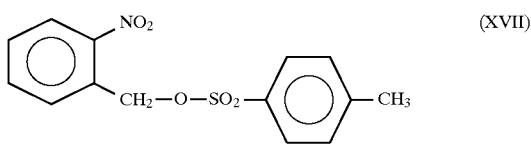
(XVII)

The photo-induced cationic polymerization initiator (B) is available as commercial products. Such products include, for example, Cyracure UVI-6970, Cyracure UVI-6974 and Cyracure UVI-6990 (these are products of Union Carbide Corporation of U.S.), Irgacure 264 (a product of Ciba Geigy Co.) and CIT-1682 (a product of Nippon Soda Co., Ltd.).

Of the above-mentioned cationic initiators, compounds having hexafluorophosphate anion ($PF_6^-$) are preferred in view of the toxicity, general-purpose applicability, etc.

The photo-induced cationic polymerization initiator (B) can be used in an amount of generally 0.01–20 parts by weight, preferably 0.05–15 parts by weight, more preferably 0.1–10 parts by weight per 100 parts by weight (as solid content) of the resin (A).

Resin composition

The resin composition of the present invention can be prepared by uniformly mixing the resin (A) and the initiator (B) as necessary in the presence of a solvent or a dispersing agent. As the solvent or the dispersing agent, there can be used the same polymerization solvent as used in production of the resin (A) or other solvent. Specific examples thereof are hydrocarbon type solvents such as hexane, heptane, octane and the like; halogenated hydrocarbon type solvents such as dichloromethane, chloroform and the like; alcohol type solvents such as methanol, ethanol, isopropanol and the like; ether type solvents such as diethyl ether, dipropyl ether, cellosolve, diethylene glycol monobutyl ether and the like; ketone type solvents such as acetone, methyl ethyl ketone, cyclohexanone and the like; and ester type solvents such as ethyl acetate, 2-ethylhexyl acetate and the like.

The resin composition of the present invention may further comprise, as necessary, a monomeric oxetane compound, for example, a compound of the above formula (II) such as 3-ethyl-3-hydroxymethyloxetane, 3-butyl-3-hydroxymethyloxetane or the like. The amount of the monomeric oxetane compound used is preferably 50 parts by weight or less, particularly 20 parts by weight or less per 100 parts by weight (as solid content) of the resin (A).

The present resin composition may furthermore comprise, as necessary, a reactive diluent such as polyepoxide, polyol or the like.

The present resin composition can be preferably used, for example, as a coating composition. In that case, the present composition can further comprise, as necessary, various additives such as pigment (e.g. coloring pigment, extender pigment and rust-preventive pigment), fluidity-controlling agent (e.g. silicone and polyamide), ultraviolet absorber, antisagging agent, thickening agent and the like, in amounts used ordinarily.

The coating composition of the present invention comprising the resin (A) and the photo-induced cationic polymerization initiator (B) is coated or printed on a base material (substrate) and can be cured by irradiation with an active energy ray.

The coating or printing can be conducted by an ordinary coating or printing means such as spray coating, brush coating, roller coating, dip coating, screen printing or the like. The preferable "as dried" thickness of the film formed is generally about 1–100μ.

The active energy ray used for irradiation includes an ultraviolet light and an electron beam. The irradiation with an ultraviolet light can be conducted at a wavelength of about 200–400 nm at a dose of about 10–3,000 mj/cm². The irradiation with an electron beam can be conducted at 2–3 Mrad.

The resin composition of the present invention has excellent active energy ray-curability and can be used in applications such as coating, ink, press plate material, photoresist, sealing agent, surface treating agent and the like.

EXAMPLES

The present invention is hereinafter described specifically by way of Examples. In the Examples, parts and % are by weight.

Production Examples 1–8, Comparative Production Examples 1–2

In a 3-liter four-necked flask equipped with a stirrer, a cooler and a dropping funnel were placed 350 parts of xylene and 100 parts of n-butanol. The flask contents were heated to 100° C. Then, from the dropping funnel was dropped, in 3 hours, a solution of 15 parts of azobisisobutyronitrile dissolved in a monomer mixture having a composition shown in Table 1. After the dropping, aging was conducted for 1 hour. Thereto was dropwise added, in 1 hour, a solution of 5 parts of azobisdimethylvaleronitrile dissolved in 50 parts of xylene to give rise to a reaction. After the reaction, the resulting resin solution was poured into 5 liters of cold methanol; the mixture was filtered through a silk cloth; the material on the cloth was dried in a vacuum drier for 24 hours to obtain white resin powders (A-1) to (A-10). Each resin obtained was measured for number-average molecular weight and number of each functional group in molecule by gel permeation chromatography. The results are shown in Table 1.

ing solution was mixed with the following photo-induced cationic polymerization initiator (B-1) or (B-2) in the proportions shown in Table 2, to obtain active energy ray-curable coating compositions of Examples 1–9 and Comparative Examples 1–2.

(B-1): Cyracure UVI-6970 (trade name) (a product of Union Carbide Corporation (B-2): Irgacure 264 (trade name) (a product of Ciba Geigy Co.)

Each of the active energy ray-curable coating compositions of Examples 1–9 and Comparative Examples 1–2 was applied on a glass plate by flow coating, so as to form a film of about 30 $\mu$ in thickness as dried. The film was irradiated

TABLE 1

| | Production Examples | | | | | | | | Comparative Production Examples | |
|---|---|---|---|---|---|---|---|---|---|---|
| | 1 | 2 | 3 | 4 | 5 | 6 | 7 | 8 | 1 | 2 |
| Composition of monomers | | | | | | | | | | |
| 3-Methacryloyloxymethyl-3-ethyloxetane | 46 | | 46 | | 46 | | 46 | | 92 | |
| 3-Acryloyloxymethyl-3-ethyloxetane | | 43 | | 43 | | 43 | | 43 | | |
| Glycidyl methacrylate | 36 | 36 | | | | | | | | |
| Methylglycidyl methacrylate | | | | | | | 39 | 39 | | |
| 3,4-Epoxycyclohexylmethyl methacrylate | | | 49 | 49 | | | | | | |
| 3,4-Epoxycyclohexylmethyl acrylate | | | | | 46 | 46 | | | | 98 |
| n-Butyl acrylate | 418 | 421 | 405 | 408 | 408 | 411 | 415 | 418 | 408 | 402 |
| Resin powder | (A-1) | (A-2) | (A-3) | (A-4) | (A-5) | (A-6) | (A-7) | (A-8) | (A-9) | (A-10) |
| Properties | | | | | | | | | | |
| Number-average molecular weight | 16,000 | 15,000 | 15,000 | 16,000 | 16,000 | 16,000 | 16,500 | 16,000 | 15,000 | 16,000 |
| Number of oxetane functional groups | 8.0 | 7.5 | 7.5 | 8.0 | 8.0 | 8.0 | 8.3 | 8.0 | 7.5 | 0 |
| Number of epoxy groups | 8.0 | 7.5 | 7.5 | 8.0 | 8.0 | 8.0 | 8.3 | 8.0 | 0 | 7.5 |

Examples 1–9 and Comparative Examples 1–2

100 parts of each of the resin powders (A-1) to (A-10) obtained in Production Examples 1–8 and Comparative Production Examples 1–2 was dissolved in 30 parts of Celloxide 2021 (trade name) (a polyepoxide reactive diluent produced by Daicel Chemical Industries, Ltd.). The resulting solution was mixed with an ultraviolet light emitted from a high-pressure mercury lamp, at various doses to obtain various cured films. The surface of each of the cured films was rubbed back and forth ten times with a three-layered gauze impregnated with xylene, after which the surface was observed. For each coating composition, the minimum ultraviolet dose (mj/cm$^2$) which gave no abnormality (e.g. no scar or no solvent wash) in coating film, was shown in Table 2 as "minimum ultraviolet dose".

TABLE 2

| | | Examples | | | | | | | | | Comparative Examples | |
|---|---|---|---|---|---|---|---|---|---|---|---|---|
| | | 1 | 2 | 3 | 4 | 5 | 6 | 7 | 8 | 9 | 1 | 2 |
| Compounding | | | | | | | | | | | | |
| Resin powder | Kind | (A-1) | (A-2) | (A-3) | (A-4) | (A-5) | (A-6) | (A-7) | (A-8) | (A-1) | (A-9) | (A-10) |
| | Amount (parts) | 100 | 100 | 100 | 100 | 100 | 100 | 100 | 100 | 100 | 100 | 100 |
| Photo-induced cationic polymerization initiator | Kind | (B-1) | (B-1) | (B-1) | (B-1) | (B-1) | (B-1) | (B-1) | (B-1) | (B-2) | (B-1) | (B-1) |
| | Amount (parts) | 2.0 | 2.0 | 2.0 | 2.0 | 2.0 | 2.0 | 2.0 | 2.0 | 2.0 | 2.0 | 2.0 |
| Minimum ultraviolet dose (mj/cm$^2$) | | 120 | 120 | 80 | 80 | 80 | 80 | 150 | 150 | 120 | 300 | 500 |

What is claimed is:

1. An active energy ray-curable resin composition comprising:

(A) a resin having, in the molecule, epoxy groups and oxetane functional groups represented by the following formula (I)

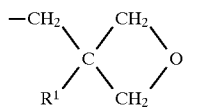

wherein $R^1$ is a hydrogen atom, an alkyl group of 1–6 carbon atoms, a fluorine atom, a fluoroalkyl group of 1–6 carbon atoms, an allyl group, an aryl group, an aralkyl group, a furyl group or a thienyl group, and (B) a photo-induced cationic polymerization initiator.

2. A composition according to claim 1, wherein $R^1$ is an alkyl group of 1–4 carbon atoms.

3. A composition according to claim 1, wherein the resin (A) has, in the molecule, an average of 2–100 oxetane functional groups and an average of 2–100 epoxy groups.

4. A composition according to claim 1, wherein the resin (A) is an acrylic resin having a number-average molecular weight of about 300–200,000.

5. A composition according to claim 1, further comprising a monomeric oxetane compound.

6. An active energy ray-curable coating composition comprising a composition of claim 1.

7. A coated article obtained by applying a composition of claim 6 onto a material to by coated.

8. A composition according to claim 1, wherein the photo-induced cationic polymerization initiator (B) is selected from the compounds represented by the following formulas (III) to (XVII):

 (III)

wherein Ar is an aryl group; and $X^-$ is $PF_6^-$, $SbF_6^-$ or $AsF_6^-$,

 (IV)

wherein Ar and $X^-$ each have the same definition as given above,

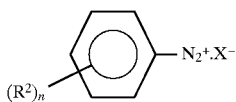 (V)

wherein $R^2$ is an alkyl group of 1–12 carbon atoms or an alkoxy group of 1–12 carbon atoms; n is an integer of 0–3; and X has the same definition as given above,

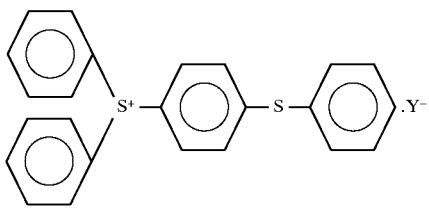 (VI)

wherein $Y^-$ is $PF_6^-$, $SbF_6^-$, $AsF_6^-$ or $SbF_5(OH)^-$,

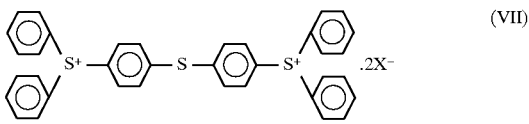 (VII)

wherein $X^-$ has the same definition as given above,

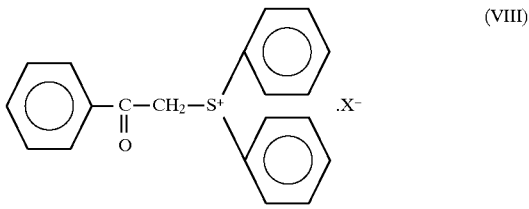 (VIII)

wherein $X^-$ has the same definition as given above,

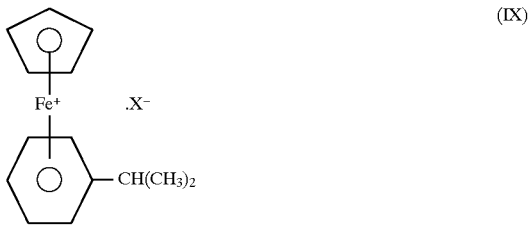 (IX)

wherein $X^-$ has the same definition as given above,

 (X)

wherein $R^3$ is an aralkyl group of 7–15 carbon atoms or an alkenyl group of 3–9 carbon atoms; $R^4$ is a hydrocarbon group of 1–7 carbon atoms or a hydroxyphenyl group; $R^5$ is an alkyl group of 1–5 carbon atoms which may contain one or more oxygen atoms or one or more sulfur atoms; and $X^-$ has the same definition as given above,

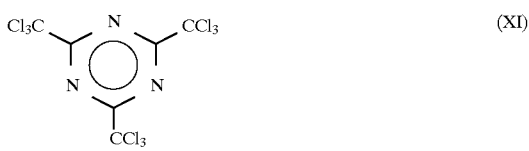 (XI)

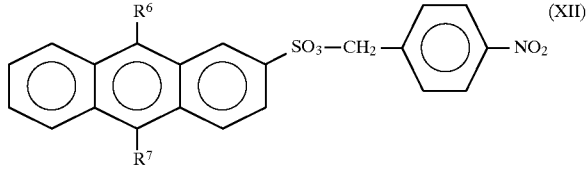 (XII)

wherein $R^6$ and $R^7$ are each independently an alkyl group of 1–12 carbon atoms or an alkoxy group of 1–12 carbon atoms,

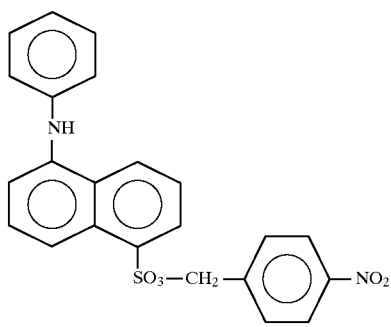
(XIII)

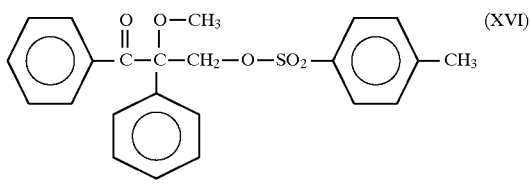
(XVI)

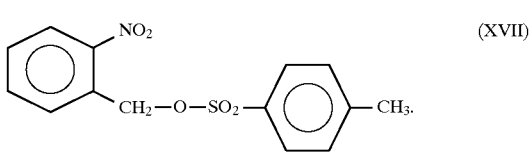
(XVII)

(XIV)

wherein $R^6$ and $R^7$ each have the same definition as given above,

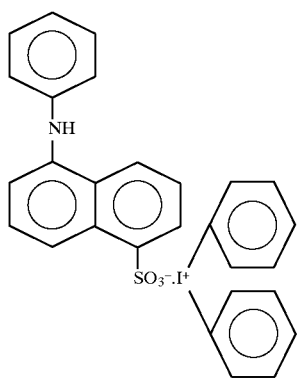
(XV)

9. A composition according to claim 8, wherein Ar represents a phenyl group.

10. A composition according to claim 1, wherein the proportion of the polymerization initiator (B) is 0.01–20 parts by weight per 100 parts by weight of solid content of resin (A).

11. A composition according to claim 10, wherein the proportion of the polymerization initiator (B) is 0.05–15 parts by weight per 100 parts by weight of solid content of resin (A).

* * * * *